Figure 3:
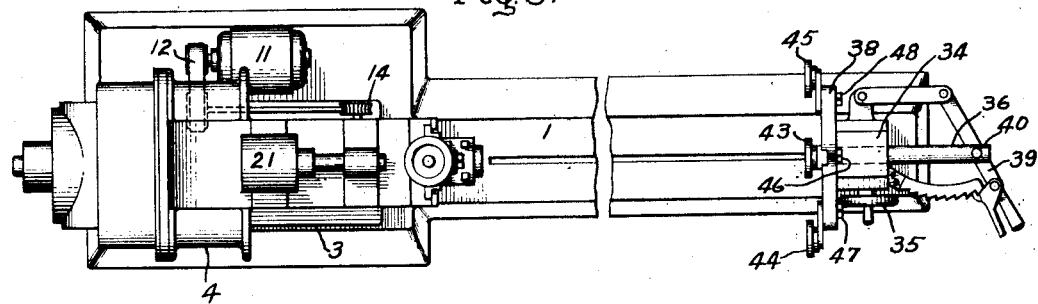

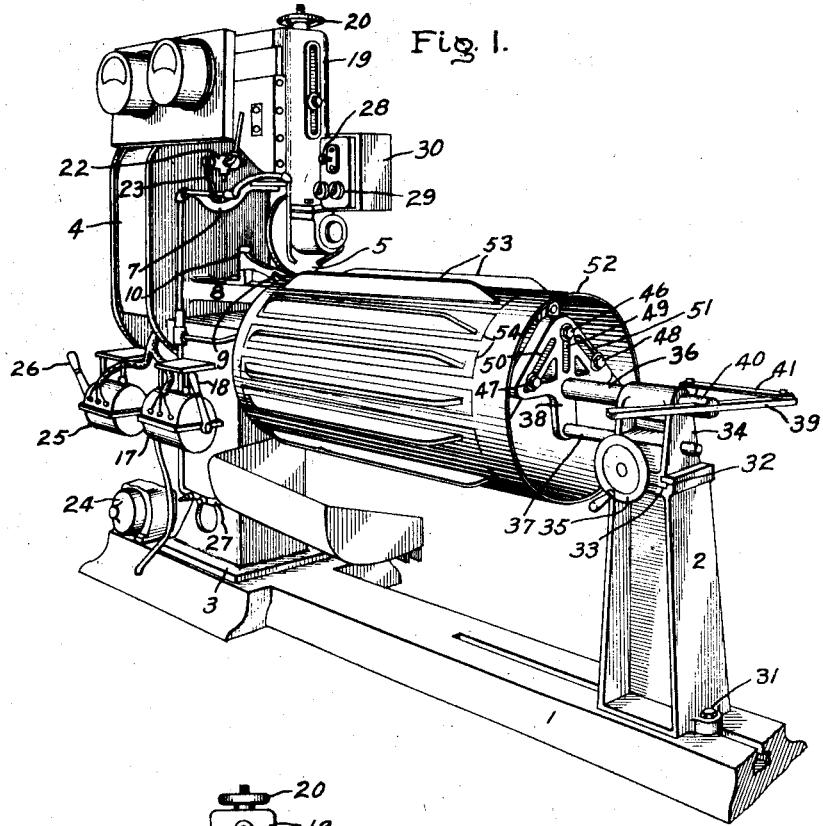

Oct. 5, 1926.

H. W. TOBEY

LINE WELDING

Filed Nov. 8 1924

1,601,928

2 Sheets-Sheet 2

Inventor
Harry W. Tobey
by
His Attorney

Patented Oct. 5, 1926.

1,601,928

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

LINE WELDING.

Application filed November 8, 1924. Serial No. 748,763.

My invention relates to line welding machines wherein means are provided for producing relative movement between the work and the electrodes through which electric current is transmitted to the metal of the weld, and has for its object the provision of an improved arrangement for correcting the tendency of the work to creep or move in a direction lateral to the line of the weld and for controlling the movement of the electrodes to secure welding in a desired line.

In the resistance line welding of metal parts, difficulty is frequently encountered due to the tendency of the work to creep in a direction lateral to the line of the weld. This tendency of the work to creep may be the effect of different causes, but it is apparent that when creeping starts it tends to continue, just as an automobile on a street would run to the curb if the street were turned slightly under the automobile. The analogy is not quite exact, since the welding electrodes rotate in a fixed plane and the work creeps, whereas the street is immovable. It is therefore desirable that some means be provided for producing forces of such a magnitude and direction as to neutralize the effect of the forces tending to produce creepage of the work and that these neutralizing forces be exerted on the work without subjecting the electrodes to undue strain. In accordance with my invention, these neutralizing forces are produced through slight adjustments in the position of a member upon which the work is partially supported. As will be readily understood, this method of maintaining the weld in alinement with the welding electrode has the very great advantage that the electrodes are themselves enabled to produce the required corrective or neutralizing forces without danger of distortion or injury to the electrodes. Creeping may be prevented by over-balancing the lateral forces tending to produce creepage of the work, but this subjects the electrodes to continued distorting stresses which destroy the electrodes or reduce their life.

My invention will be better understood from the following description when considered in connection with the accompanying drawings, and its scope will be pointed out in the appended claims.

Referring to the drawings, Figs. 1, 2, 3 and 4 respectively show perspective, end, plan and side views of a line welding machine in which my invention has been embodied.

The drawings show a welding machine comprising a base 1 upon which the support members 2 and 3 are mounted. The member 3 is arranged to support the welding transformer 4 from which current is transmitted to the disk electrodes 5 and 6 through the leads 7 and 8 of the transformer secondary winding. A guide roller 9 mounted in a bracket pivoted at 10 is arranged to engage the edge of the work, shown as a tank, as it is rotated between the electrodes 5 and 6. When the edge of the work is irregular, this bracket may be swung to the left into a position where the guide roller does not interfere with the rotation of the work.

Figure 4:
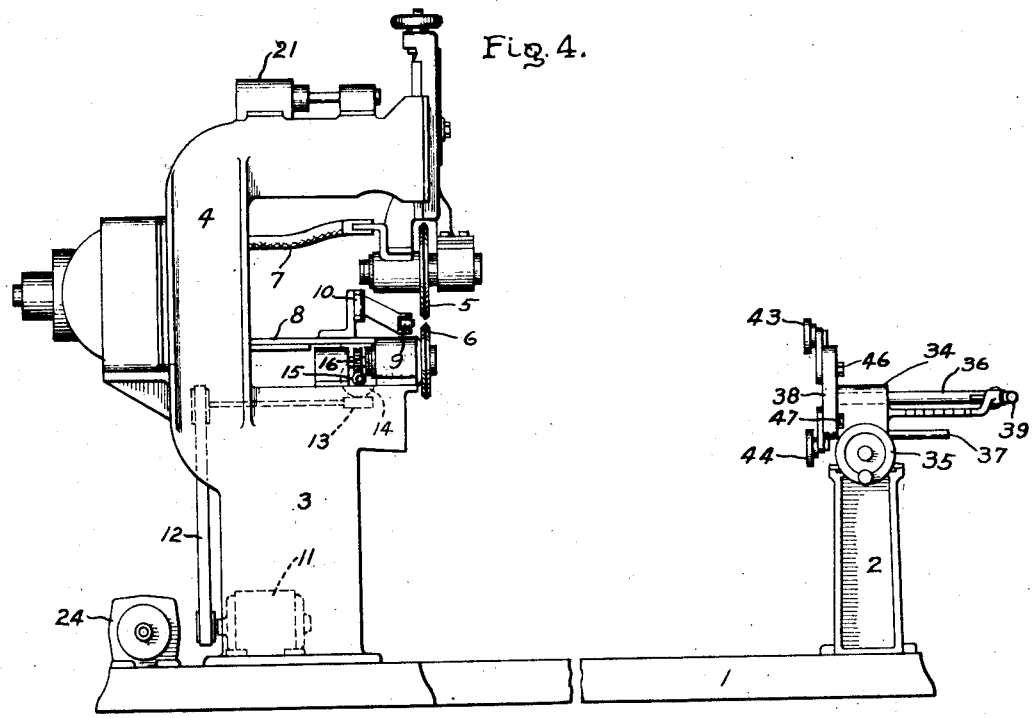

As indicated more clearly in Figs. 3 and 4. the electrode 6 is aranged to be driven by the motor 11 to which it is mechanically coupled through a belt 12, a worm and gear 13 and 14, and a worm and gear 15 and 16. Current for operating the motor 11 may be supplied from any suitable source through a controller 17 which is provided with a handle 18 for controlling the rotation of the electrode 6. The electrode 5 is supported by a member 19 which is adapted to be moved in a vertical direction either by means of a handwheel 20, or by a fluid pressure device 21 arranged to be mechanically coupled to the member 19 through any suitable means, such as a rack and pinion for example, and to be operated by fluid supplied from any suitable source through the valve 22 shown in Fig. 1 as provided with an operating handle 23 for moving the electrode into and out of contact with the work in response to reciprocation of the device 21.

A motor 24 is connected to be supplied with current through a controller 25 which is provided with a handle 26 for controlling the operation of a pump which is driven by the motor 24 to supply cooling fluid to the electrodes 5 and 6 through the pipe 27 of Fig. 1. A switch 28 is provided for controlling the operation of an induction regulator through which current is supplied to the weld. Switch 29 is arranged to control the connection between the primary circuit of the transformer 4 and an interrupter provided in the casing 30 for the purpose of periodically interrupting the welding current under certain conditions of operation. The various features considered up to this point are for the most part old and well known to those skilled in the art. For this reason they need be considered only in sufficient detail to understand their relation to their stationary work support which forms an essential part of my invention.

The stationary support member, which is located at a point laterally displaced from the plane in which the electrodes are rotated, is mounted upon the pedestal 2 which is arranged to be adjusted to different positions along the base 1 and to be attached thereto by means of a bolt 31. At its upper end, the pedestal 2 is provided with ways 32 adapted to receive lugs 33 of the member 34 and to permit rectilineal movement of this member in a direction transverse to the longitudinal axis of the base 1 in response to rotation of a handwheel 35. Shafts 36 and 37 are arranged to support a member 38 and to be moved to and fro through suitable bearings in the member 34 by means shown as a lever 39 pivoted to the shaft 36 at 40 and coupled to the member 34 through a link 41. The lever 39 is preferably provided with a catch, as illustrated in Figs. 3 and 4, for the purpose of maintaining the member 38 in any position to which it has been adjusted. Contact rollers 43, 44 and 45 are attached to the member 38 by means of bolts 46, 47 and 48 which are arranged to be moved along the slots 49, 50 and 51 for the purpose of adjusting the positions of the roller contacts. This arrangement is advantageous in that it permits adjustment of the contact rollers in a manner to suit the requirements of the work.

The work is illustrated as a transformer tank comprising a cylindrical body member 52 and a plurality of hollow cooling fins 53 having flanges 54 arranged to be welded to the cylindrical body 52.

Assuming the longitudinal edges of the fin flanges to have been welded to the cylindrical body by a machine suitably designed for this work and the work to be placed in the machine as illustrated, the left hand ends of the flanges 54 may be welded to the cylindrical body by operating the lever 23 to force the electrode 5 into contact with work, operating the controller handle 26 to initiate circulation of the cooling water, and operating the handle 18 to start rotation of the electrodes. As the electrodes rotate, the work is rotated in contact with the roller 43 and the left hand ends of the flanges 54 are moved in between the electrodes 5 and 6. The primary circuit of the transformer is then closed, either through an interrupter or independently thereof, and the weld is made in the usual manner. It has been observed that the use of an interrupter is especially advantageous where the electrodes are rolled over the end of a completed weld. It is therefore desirable periodically to interrupt the welding current at least during the operation of overlapping the ends of the weld. When the weld is completed, the primary circuit of the transformer is opened, the controller 26 is operated to cut off the supply of cooling fluid, the lever 23 is operated to raise the electrode 5 and the lever 39 is operated to the right to disengage the stationary support from the work.

It will be observed that the work is free to rock about the electrode 6 and the contact roller 43 to a slight extent. This enables the weld to be readily made over the irregularities formed by the ends of the flanges 54. As the work rotates, there is at times a tendency for it to creep along the line of support in a direction lateral to the line of the weld. When this occurs, the handwheel 35 is operated in a manner to move either the contact roller 44 or 45 into contact with the inner surface of the tank, thus exerting on the work a force of such a value and direction as to counteract the forces tending to produce creepage of the work. By manipulation of the handwheel 35, it is also possible to weld along any desired line and to keep the weld at any given distance from the edges of the work even though this edge be irregular. My invention thus has utility both as a means of preventing creepage of the work and as a means of predetermining the course of the weld.

A base or head may be welded to the tank in the manner heretofore described, where the base or head is provided with a circular portion which fits into or over the end of the tank. I have explained my invention by illustrating and describing a certain specific embodiment thereof, but it will be readily understood by those skilled in the art that the arrangement of this embodiment may be modified in certain of its details. I accordingly, do not wish to be restricted to the particular arrangement disclosed herein by way of example for the purpose of setting forth my invention in accordance with the patent statutes. The terms of the appended claims are, therefore, not restricted to the precise arrangement disclosed, but are intended to cover all changes and modifications within the true spirit and scope of my invention.

What I claim as new and desire to secure by Letters Patent of the United States, is:—

1. A welding machine of the type wherein a pair of electrodes are arranged to be connected with a welding transformer and to be rotated in contact with opposite sides of the work for transmitting welding current therethrough and wherein means are provided for producing relative movement between said work and said electrodes to produce a line weld, characterized by the fact that a work support laterally displaced from the plane in which said electrodes rotate is arranged to have its position adjusted in a direction substantially parallel to said plane for controlling movement of the work in a direction lateral to the line of the weld.

2. In a welding machine comprising a pair of electrodes arranged to engage the work for transmitting welding current therethrough to produce a line weld, the combination of means for producing relative movement between said work and electrodes, and a work support laterally displaced from said electrodes, said support being arranged to be moved in a direction substantially perpendicular to the line of the weld for moving it into and out of contact with said work and to be moved in a direction substantially parallel with the line of the weld for controlling movement of said work in a direction lateral to the line of the weld.

3. In a welding machine comprising a pair of rotatable disk electrodes arranged to engage opposite sides of the work for transmitting welding current therethrough to produce a line weld, the combination of means for producing relative movement between said work and electrodes, and a work supporting means laterally displaced from the plane in which said electrodes rotate, said supporting means including a pedestal, a member supported by said pedestal and arranged to be moved relatively thereto for controlling movement of the work in a direction lateral to the line of the weld, and a contact member supported by said movable member and arranged to be moved relatively thereto for moving it into and out of contact with said work.

4. The method of operating a welding machine having a pair of rotatable disk electrodes for producing a line weld and means for supporting the work at a point laterally displaced from the plane in which said electrodes rotate, which comprises rotating said electrodes in contact with opposite sides of said work for transmitting current therethrough and for producing relative motion between said work and electrodes, and moving said supporting means rectilineally in a direction substantially parallel to the plane in which said electrodes rotate for preventing creepage of the work in a direction lateral to the line of the weld.

In witness whereof, I have hereunto set my hand this 27th day of Oct., 1924.

HARRY W. TOBEY.